(No Model.)
R. CONWAY.
NUT LOCK.
No. 423,028. Patented Mar. 11, 1890.
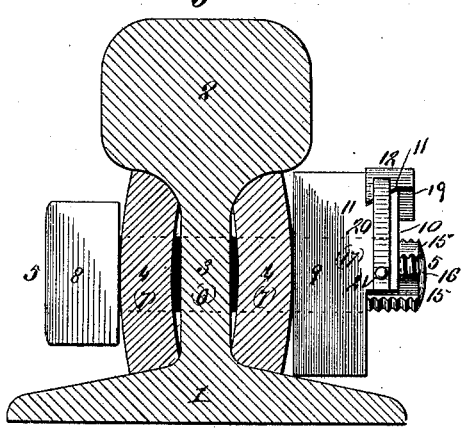
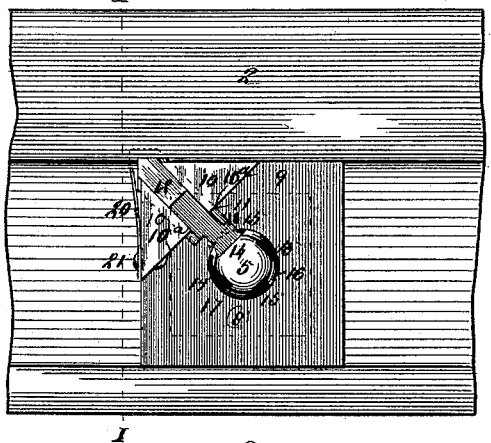
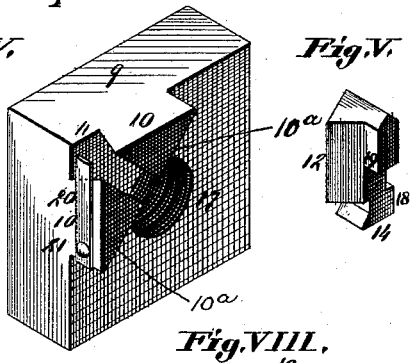
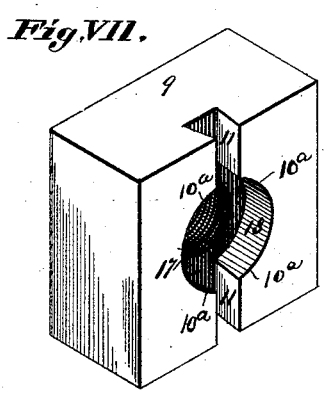
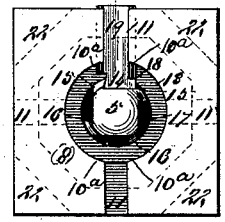
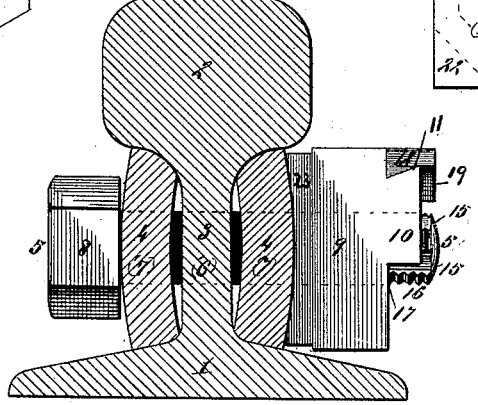
Attest:
Charles Pickles.
E. Arthur.
Inventor:
Richard Conway.
By Knight Bro's.
Attys.
N. PETERS, Photo-Lithographer, Washington, D. C.

UNITED STATES PATENT OFFICE.

RICHARD CONWAY, OF ARGENTVILLE, ASSIGNOR OF ONE-HALF TO RICHARD H. NORTON, OF TROY, MISSOURI.

NUT-LOCK.

SPECIFICATION forming part of Letters Patent No. 423,028, dated March 11, 1890.

Application filed June 21, 1889. Serial No. 315,110. (No model.)

*To all whom it may concern:*

Be it known that I, RICHARD CONWAY, of Argentville, Lincoln county, in the State of Missouri, have invented a certain new and useful Improvement in Locking-Nuts and Bolt-Locks, of which the following is a full, clear, and exact description, reference being had to the accompanying drawings, forming part of this specification.

This invention relates to a device for locking the coupling of screw-nuts to the bolts on which they are seated, in which the bolts are the active members and the nuts the stationary members, in which nuts radial locking-keys slide in dovetail recesses in the nuts and engage in recessed seats in the bolt to lock said bolt; and the invention consists in features of novelty hereinafter fully described, and pointed out in the claims.

Figure I is a vertical section taken on line I I, Fig. II, and shows the respective positions of the bolt on its passage through the fish-plates and through the stem of the rail and in engagement with the locking-nut, which nut, being the fixed member, provides through its sliding drop-key the means for locking the active member of the coupling—the bolt. Fig. II is a side detail of a railway-rail and a fish-plate, and shows the means, through the sliding drop-key in the nut, for locking the active bolt. It also shows the spring-key that holds the key in its seat. Fig. III is a side view of the bolt, and shows the recesses in said bolt in which the drop-key from the nut engages when locking the bolt, with the head of said bolt octagonal instead of square, as in Fig. I. Fig. IV is a perspective view of the nut, and shows the dovetail recess in which the dovetail locking drop-key works and the spring attached thereto for the retention of said key in its operative position when the bolt is used in rotary machinery. Fig. V is a perspective view of the dovetail locking drop-key. Fig. VI is a vertical section alike in all its parts to Fig. I, minus the retention-spring, and with the addition of a rubber washer between the fish-plate and nut that maintains a spring tension on said nut and prevents rattling. Fig. VII is a perspective view of a modification in which the face of the nut is made straight without any projectile portion and the dovetail recessed key-seat for the dovetail locking-key is made straight from the center bolt-hole to the side or sides of said nut, instead of angling to the corners. Fig. VIII is a front view of the same modified form of nut as shown in Fig. VII, and shows the forward end of the bolt and the dovetail key that locks the same. It also shows in broken lines the hidden form of the dovetail recess in which said locking drop-key is seated, with like recessed key-seats that extend from said bolt-hole to, respectively, the other three sides of the nut, and shows also in broken lines the hidden outlines of the octagonal head of the bolt. It also shows in broken lines across the corners the shape presented by the nut when it is made of octagonal form.

Referring to the drawings, 1 represents the foot-flange, 2 the head or tread, and 3 the connecting stem or web of a railroad-rail to which my locking-nut and bolt-lock device is attached.

4 are the fish-plates that splice the rail-joints.

5 represents the lock-bolt, which, contrary to the usual construction, is the rotary active member of the connection; 6, the perforations in the stem of the rail, and 7 like perforations in the fish-plates through which said bolt passes and in which it is seated, and 8 is the head of the bolt, which may be square, as shown in Fig. I, octagonal, as shown in Figs. III and VI, or any other suitable shape that will present a clutch-hold for the wrench that turns it, as it will be seen that with my nut and lock-bolt (contrary to general usage) it is the bolt instead of the nut that is turned to tighten the coupling.

9 represents the locking-nut, which, contrary to the usual construction, is the stationary member of the connection, and which may be constructed with extension projections 10, adjacent to one corner on its face, having abutments or walls 10ª, and between which projections the dovetail radial recess or chamber 11 is located to form a slideway for the radial locking-key or drop-bolt 12, as shown in Figs. I, II, III, and VI; or said nut may be made as shown in Figs. VII and VIII, in which said projection extends flush across the whole face of the nut, (simply increasing the thickness thereof,) and the radial dovetail recesses or chambers are then preferably run from the sides of said nut to the abutments or walls 10ª of a circle chamber 13, that is centrally located in the faces of said nut, in which the bevel-toed foot 14 of the dovetail locking-key or drop-bolts work as they seat themselves or tread on the bolt within the locking-recesses 15 in the screw-tapped end 16 of the bolt, and thus lock said bolt from turning in its screw-seat 17 in said nut, the nut itself being held from turning when used in a rail-splice by the foot-flange 1 of the rail.

When used in machinery or in any other attachment in which there is no equivalent of the foot-flange of the rail to prevent the turning of the nut, then any suitable stay-lug projecting from the castings alongside said nut may be provided to prevent its turning.

The foot of the locking drop-key is provided with a projecting heel 18, which, coming against an abutment or wall 10ª at the entrance to the dovetail recess 11, prevents the withdrawal of said locking-key, and a projection 19 on the face side of said key provides a catch-hold that enables the operator to elevate it sufficiently from its locking-seat in one of the recesses 15 to unlock the bolt, so that it can be freely turned when it is desired to withdraw the same.

20 represents a retention-spring, one end of which is secured to the locking-nut by the rivet 21, and the other end exerts an elastic pressure on the locking-key, which spring is especially intended for use when the combined locking-nut and bolt-lock is used on rotary machinery, so as to retain the lock-key in its recessed seat in the bolt when in the course of its revolution the key becomes inverted, so that in the meantime it ceases to be a gravity-lock. When, on the other hand, it is used in coupling rails, or in any other stationary position, the spring may be dispensed with, as a nut that carries the locking-key in this device (and not the bolt) is the stationary member, and, the rail being stationary, the key never assumes an adverse inverted position.

In Fig. VIII is shown a view of the locking-nut in which in broken lines 22 across the corners, in conjunction with full lines around the rest of the nut, is defined the form of said nut when it is made of octagon shape, as is preferred in confined locations, especially in some classes of machinery. A rubber washer 23 exerts a continuous elastic pressure against the fish-plate and the locking-nut, and serves as an anti-rattler spring-buffer to still the vibration engendered by the passage of trains over the rails when used in fish-joint couplings on railways, or from the vibrating movements of any machinery in connection with which the device is used.

The operation and application of the device are as follows: When used for coupling railway-rails or other like stationary associate parts, the locking-nut is placed in position on the foot-flange of the rail—for instance, one of the square sides of the nut ranging parallel with said foot-flange and its perforate screw-seat registering with the perforations in which the bolt is to be seated in the fish-plates and in the stem of the rail. Care should be taken in placing the nut, if said nut has its dovetail locking-key chamber radiating from the bolt-hole to one of the corners, as shown in Figs. I, II, III, and VI, or to one side only, to so place it that the locking drop-key may tend downward by its own gravity and work into the locking-recesses in the bolt, and thus lock the same.

When the nuts are constructed with the locking-key chambers, as shown in Fig. VII, there are, it will be seen, two opposite positions of the nut, in which one or the other of the locking-key chambers will be brought round into the right position for effecting a gravity-lock, in that shown in Fig. VIII, in which there are or may be four such chambers, (three of them shown in broken lines,) it follows that when all four of said chambers are provided and when either of its four sides engage with the foot-flange of the rail or other like stay beneath the nut the reverse side will always present a locking-key chamber in the right position for a gravity-lock. The nut 9 now being in position, as stated, the head of the locking drop-key 12 is presented on the outer side of the nut and inserted upward through the locking-key chamber 11, its dovetail form corresponding with the dovetail construction of said chamber, it being thus passed upward until its projecting heel 18 comes in contact with the incasement that incloses said locking-key chamber, which limits its progress. The key, it will be seen, is now out of the way of the passage of the lock-bolt 5, the screw-point of which lock-bolt is then turned into its screw-seat within the nut until it is home, and presents one of its recessed locking-seats in position for the reception of the bevel-toed foot 14 of the locking-key, which, being released by the operator, falls by its own gravity into said locking-seat, thus effectually locking the bolt to the nut, which nut itself being stationary, as described, it follows that the lock is effectual under the automatic and gravitating operation of the locking drop-key until by the volition of the operator, it being desired to remove the bolt, he lifts the key from its locking-seat in said bolt until its projecting heel again limits its withdrawal, when the bolt can be freely unscrewed. As, after the projection of the screw-point of the bolt beneath the locking-key, the said key cannot be withdrawn by the way of its insertion, and in consequence of its projecting heel neither can it be elevated from the dovetail chamber in which it slides, it is evident that the key cannot be abstracted or lost without the bolt has first been withdrawn, and said bolt is subservient to the automatic gravity-lock of the key as long as the bevel-toed foot of said key rests in one of the recessed locking-chambers in the bolt.

It is evident that no amount of rattling from the passage of the trains overhead can unseat the locking-key and at the same time unscrew the bolt, and thus for stationary connections—such as the coupling of adjoining railway-rails—the spring that I have shown and described as riveted to the locking-nut may, if desired, be dispensed with; but when my invention is used in connection with rotary or revolving machinery, &c., or in coupling any parts that reverse their positions, the spring becomes an essential feature of the invention, as when the locking-chamber comes in rotation to be in the reversed position the gravity of the key then tends to unlock instead of lock the bolt; but it is effectually restrained from its withdrawal by the pressure of the spring.

For the coupling of the adjacent ends of railway-rails is my nut and bolt lock especially adapted, for where the coupling parts and the nuts are thus stationary the locking device is not then dependent on any spring or other contrivance that is liable to get out of place or out of repair or lose its integrity; but the automatic gravity-lock, (the metal locking dropkey,) subject alone to the law of gravity that never changes, can always be depended on to effect the safe locking of the bolt and retain its lock-hold until unlocked by hand.

I claim as my invention—

1. In a locking-bolt and lock-nut, the combination of the nut provided with the recessed chamber and abutment or wall, the radial locking-key 12, formed with a foot 14, having a toe and a heel, and the bolt having a seat 15, on which the foot of the key rests, substantially as described, and for the purpose set forth.

2. In a locking-nut and bolt-lock, the combination of the stationary nut provided with the dovetail recessed chamber and circle chamber 13, the dovetail radial locking-key 12, having the bevel-toed foot 14 and the projecting heel 18, and the rotary lock-bolt, the said bolt provided with recessed seats in which the bevel-toed foot of the locking-key rests to lock said bolt, substantially as described, and for the purpose set forth.

3. In a locking-bolt and lock-nut, the combination of the nut provided with the recessed chamber, the radial locking-key 12, formed with catch-hold 19 and a foot 14, having a toe and heel, and the bolt having seats 15, on which the foot of the key rests, substantially as described, and for the purpose set forth.

RICHARD CONWAY.

In presence of—
BENJN. A. KNIGHT,
SAML. KNIGHT.